Jan. 26, 1960 M. CZAJKOWSKI 2,922,676
SUN VISOR FOR AUTOMOBILES HAVING WRAP AROUND WINDSHIELDS
Filed Nov. 15, 1957 2 Sheets-Sheet 1
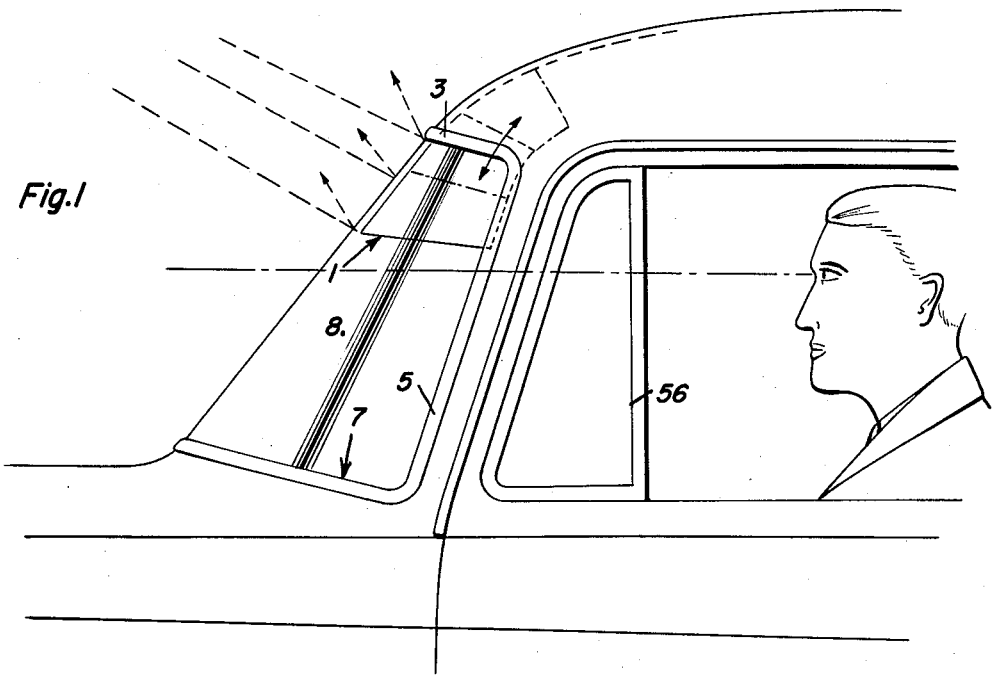
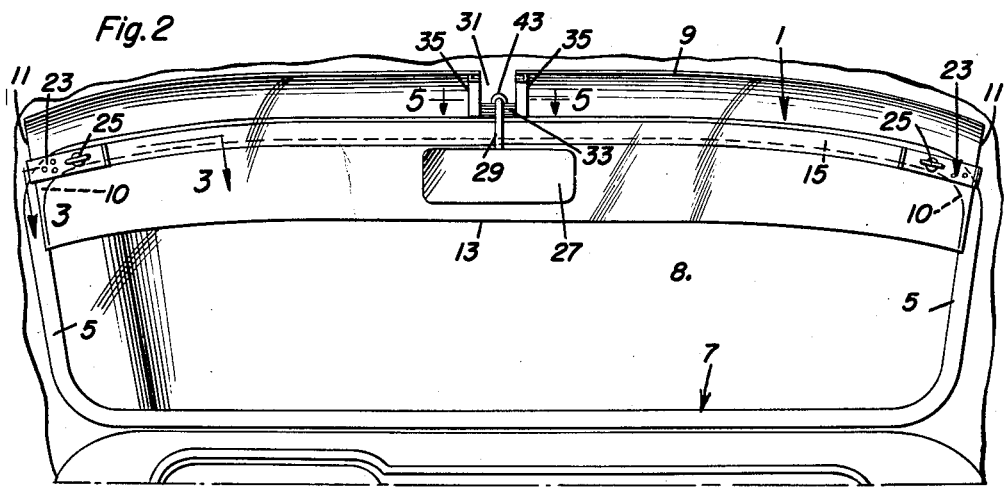
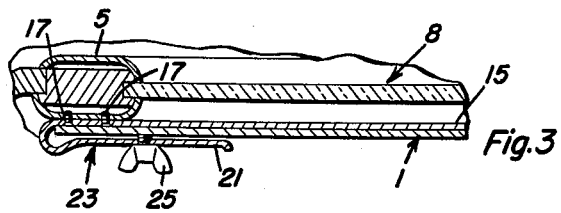
Mathew Czajkowski
INVENTOR.

Jan. 26, 1960     M. CZAJKOWSKI     2,922,676
SUN VISOR FOR AUTOMOBILES HAVING WRAP AROUND WINDSHIELDS
Filed Nov. 15, 1957     2 Sheets-Sheet 2
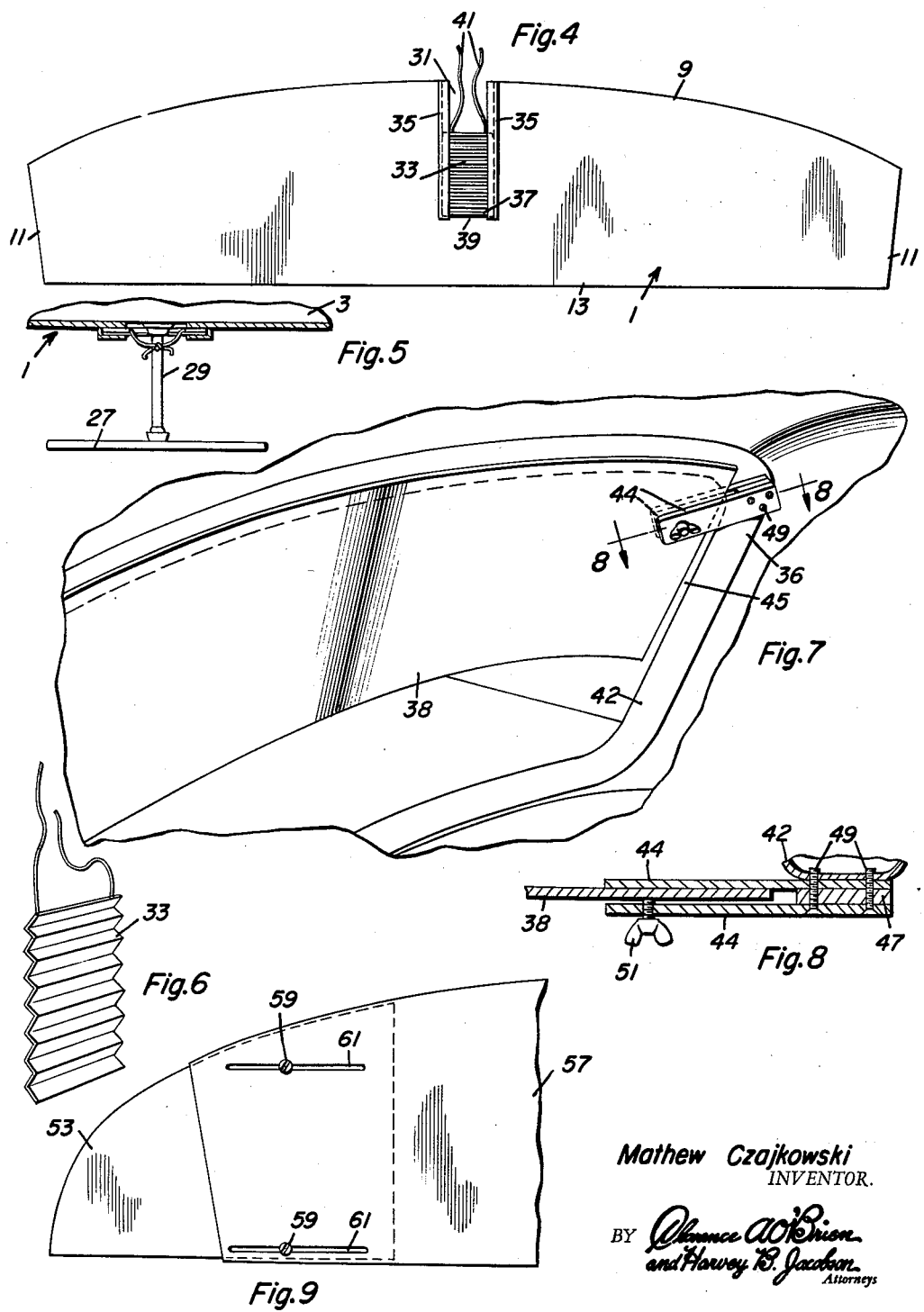
Mathew Czajkowski
INVENTOR.

United States Patent Office 2,922,676
Patented Jan. 26, 1960

2,922,676

SUN VISOR FOR AUTOMOBILES HAVING WRAP AROUND WINDSHIELDS

Mathew Czajkowski, Depew, N.Y.

Application November 15, 1957, Serial No. 696,782

2 Claims. (Cl. 296—97)

My invention relates to sun visors for use in the interior of automobiles.

By way of premise, outside sun visors for wrap-around windshields of present day automobiles are objectionable to many drivers because of their unsightly appearance, nonadjustability and tendency to increase wind resistance.

The primary object of my invention is to provide an inside sun visor for fitting such curved windshields and which is readily adjustable to different heights to suit the requirements of different drivers and adjustable into an out-of-the-way position when its use is not desired.

Another object is to provide in conjunction with the above means on the sun visor adapting it for use in the rear of the windshield without interfering with the usual rear view mirror.

Still another object is to provide a sun visor for the above purposes which is easy to install or remove, inexpensive in construction and adapted for manufacture at a low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary view in side elevation illustrating a sun visor in accordance with my invention in the preferred embodiment thereof;

Figure 2 is a fragmentary view in rear elevation;

Figure 3 is an enlarged fragmentary view in horizontal section taken on the line 3—3 of Figure 2;

Figure 4 is a view in rear elevation of the sun visor detached;

Figure 5 is a fragmentary enlarged view in longitudinal section taken on the line 5—5 of Figure 2;

Figure 6 is an enlarged perspective view of a shutter forming part of the sun visor;

Figure 7 is a fragmentary perspective view of a modified embodiment of the invention;

Figure 8 is an enlarged fragmentary view in longitudinal section taken on the line 8—8 of Figure 7; and Figure 9 is an enlarged fragmentary view in rear elevation of a second modified embodiment of the invention.

Referring to the drawings by numerals and first to Figures 1 to 6, according to my invention in the preferred embodiment a sun visor is provided comprising an elongated, rigid member 1 of light impervious, opaque sheet material and which is of a length to fit the top and ends 3, 5 of the frame 7 of the conventional wrap-around windshield 8 at the upper portion of said frame and in longitudinally extending position. The member 1 is curved longitudinally so that it is bowed in conformity with the longitudinal curvature of the windshield 8 and is generally trapezoidal in edge outline, with a top convex longitudinal edge 9 conforming generally with the longitudinal contour of the top 3 of the frame 7, ends 11 converging downwardly in conformity with the ends 5 of said frame 7 and a straight bottom edge 13. The member 1 may be formed of any suitable thin gauge, light, strong material, preferably aluminum.

Means is provided for detachably attaching the member 1 in vertically adjusted position to the top 3 of the windshield frame 7 behind the same and for vertical sliding adjustment of the member 1 and which comprises the following. A clamping bar 15 curved in conformity with the top 3 is secured to said top 3 to extend longitudinally along and against the rear side thereof by screws 17 in and adjacent the ends of the bar turned into the upper corners 10 of the windshield frame 7. The bar 15 is provided with rear return bent end portions 21 whereby end clips 23 are provided on said bar. The member 1 is secured to the bar 15 with its ends in the clips 23 by wing bolts 25 in the rear sides of the clips 25 so that said member 1 is clamped against the bar 15 and said bar is interposed between the member 1 and the windshield 8. As will be seen by loosening the wing bolts 25 the member 1 can be adjusted vertically for use at different heights on the windshield 8 or upwardly above the windshield in an out-of-the-way position as shown in broken lines in Figure 1.

In order that the member 1 may be positioned in front of the conventional rear view mirror 27 and adjusted vertically without interfering with the mounting bracket 29 of said mirror attached in the usual manner to the center of the top 3 of the windshield frame 7, the member 1 is provided in its transverse center with a rectangular notch 31 extending into the same from its top edge 9 through which the bracket 29 extends. A collapsible and extensible, accordion pleated shutter 33 is slidably mounted in upright channel guides 35 on the member 1 at the sides of the notch 31 beneath the bracket 29. The lower end 37 of the shutter 33 is suitably secured as at 39 to the member 1 and rubber impregnated tie cords 41 are provided on the upper end of the shutter for tying around the bracket as indicated at 43 so that as the member 1 is adjusted downwardly the shutter 33 will close the notch 31 below the top 3 of the frame 7 to prevent sunlight from passing through the notch 31.

As will now be seen, by loosening the wing bolts 25 the member 1 may be adjusted vertically for use at different heights as a sun visor, or it may be adjusted upwardly of the windshield 8 into an out-of-the-way position when not in use and as shown in broken lines in Figure 1.

In the modified embodiment shown in Figures 7 and 8 the sun visor comprises a member 38 like the member 1, but vertically adjustably secured to each upper corner 36 of the windshield frame 42 by a clip in the form of a pair of opposite bars 44 straddling one end 45 of the member. The pair of bars 44 are spaced apart at corresponding ends by a spacer block 47 and secured to the frame 42 by screws 49. A wing bolt 51 extends through one bar 44 for clampingly engaging the member 38 with the other bar 44.

In the modified embodiment shown in Figure 9 an end flap 53 is provided on an end of the member 57 of flexible material for flexing to overlie a front side flap 56 of a front window. Screw studs 59 in the flap 53 extending through longitudinal slots 61 in the member 57 provide for adjusting the flap 53 longitudinally of the member 57 as may be found desirable.

The foregoing will it is believed suffice to impart a clear understanding of my invention without further explanation.

However, it is to be understood that the embodiments of the invention herein disclosed are illustrated only, and changes and other modifications may be resorted to falling within the scope of the appended claims.

What is claimed as new is as follows:

1. In combination with an automobile wrap-around windshield longitudinally curved and having a frame and upper corners, an inside sun visor for said windshield comprising an elongated, opaque member of sheet material longitudinally curved in conformity with said windshield, and means clampingly engaging said member at its ends and attached to said corners behind said windshield and vertically adjustably supporting said member behind the windshield in longitudinally extending position relative thereto and over the upper portion of the windshield, comprising a bar having ends return bent behind the bar to form terminal clips on the bar straddling the ends of the member.

2. The combination of claim 1, said member having an upper edge provided with a notch for straddling a rear vision mirror bracket on said windshield to permit vertical adjustment of said member relative to said bracket, an extensible accordion pleated shutter slidably mounted on and connected to said member for extension upwardly to close said notch and having means thereon attachable to a mirror bracket to exert pull on said shutter to extend the shutter in response to downward adjustment of said member relative to a mirror bracket straddled by said notch.

References Cited in the file of this patent

UNITED STATES PATENTS

| | | |
|---|---|---|
| 2,252,715 | Levy | Aug. 19, 1941 |
| 2,252,716 | Levy | Aug. 19, 1941 |
| 2,289,644 | Gano | July 14, 1942 |
| 2,549,395 | Short | Apr. 17, 1951 |
| 2,556,950 | Walker | June 12, 1951 |
| 2,633,381 | Francesco | Mar. 31, 1953 |
| 2,829,003 | Moyes | Apr. 1, 1958 |